US012711697B2

(12) United States Patent
Pomerantz

(10) Patent No.: US 12,711,697 B2
(45) Date of Patent: Aug. 18, 2026

(54) LIGHTSPILL DISPLAY FOR PASS-THROUGH VIDEO

(71) Applicant: Apple Inc., Cupertino, CA (US)

(72) Inventor: Stuart M Pomerantz, Boulder, CO (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 18/623,308

(22) Filed: Apr. 1, 2024

(65) Prior Publication Data

US 2024/0338889 A1 Oct. 10, 2024

Related U.S. Application Data

(60) Provisional application No. 63/456,925, filed on Apr. 4, 2023.

(51) Int. Cl.

*G06T 15/50* (2011.01)
*G06T 19/00* (2011.01)
*G06T 19/20* (2011.01)

(52) U.S. Cl.

CPC .......... *G06T 15/503* (2013.01); *G06T 19/006* (2013.01); *G06T 19/20* (2013.01); *G06T 2219/2012* (2013.01); *G06T 2219/2016* (2013.01)

(58) Field of Classification Search

None

See application file for complete search history.

(56) References Cited

U.S. PATENT DOCUMENTS 10,867,450 B2 12/2020 Todeschini
2012/0092328 A1 * 4/2012 Flaks .................... G06V 20/10 345/419
2018/0182160 A1 6/2018 Boulton et al.
2020/0368616 A1 11/2020 Delamont
2021/0097757 A1 4/2021 Yeung
2022/0326837 A1 10/2022 Dessero
2025/0245789 A1 * 7/2025 Xiang .................. G06T 7/0002

FOREIGN PATENT DOCUMENTS

WO WO 2018/200337 11/2018
WO 2022066399 A1 3/2022

OTHER PUBLICATIONS

Boorboor et al., VoxAR: Adaptive Visualization of Volume Rendered Objects in Optical See-Through Augmented Reality, Aug. 31, 2021, Journal of Latex Class Files, vol. 14, No. 8, p. 1-12 (Year: 2021).*

European Patent Office, Communication pursuant to Article 94(3) EPC issued in European Patent Application No. 24168172.5 dated Apr. 29, 2026 (Four (4) pages).

* cited by examiner

*Primary Examiner* — Robert J Craddock

(74) *Attorney, Agent, or Firm* — Thompson Hine LLP

(57) ABSTRACT

Various implementations disclosed herein include devices, systems, and methods that uses blend circuitry to provide a view of live pass-through video with a virtual object including a light-spill effect. For example, a process includes capturing pass-through video of a physical environment. The process further includes capturing virtual content. The process further includes calculating a color from the virtual content. The process further includes controlling the blend circuitry to generate an augmented reality video by blending the pass-through video with the virtual content and by modifying at least one portion of the pass-through video with the calculated color from the virtual content.

18 Claims, 6 Drawing Sheets

LIGHTSPILL DISPLAY FOR PASS-THROUGH VIDEO

CROSS-REFERENCE TO RELATED APPLICATIONS

This Application claims the benefit of U.S. Provisional Application Ser. No. 63/456,925 filed Apr. 4, 2023, which is incorporated herein in its entirety.

TECHNICAL FIELD

The present disclosure generally relates to systems, methods, and devices that provide live pass-through video blended with virtual objects and visual effects.

BACKGROUND

Existing extended reality (XR) presentation techniques enable people to view a combination of virtual and real content. However, such techniques may not efficiently facilitate realistic presentation of lighting effects with respect to the virtual and real content.

SUMMARY

Various implementations disclosed herein include devices, systems, and methods that enable presentation of a view of live pass-through video content in combination with virtual content comprising a virtual object that includes a light-spill effect (associated with lighting attributes of the virtual object) presented adjacent to, around, and/or near the virtual object. In some implementations, the virtual object may include, inter alia, a virtual movie screen, a virtual television (TV), a virtual diffuse-light producing three-dimensional (3D) object, a 2D plane based object embedded in within a 3D environment (e.g., a photo application, a web browser application, etc.), etc. In some implementations, the light-spill effect may be added by modifying a display attribute of a portion of the live pass-through video content (e.g., a wall, a floor, furniture, etc.) located around or adjacent to the virtual object. For example, a display attribute may include, inter alia, a color attribute, a tinting attribute, a dimming attribute, a light glow attribute, etc.

In some implementations, the light-spill effect may be enabled with respect to the live pass-through video content via usage of a scaled down version of live pass-through video content color video texture thereby allowing a color of the light-spill effect to be multiplied with respect to a color of a physical environment. In some implementations, the light-spill effect may be enabled with respect to the live pass-through video content via usage of a reconstructed geometric mesh (e.g., generated via a software development kit enabling development of augmented reality (AR) experiences) to further enhance lighting computation by using surface normals generated by the reconstructed geometric mesh. In some implementations, the light-spill effect may be enabled (to generate a realistic or artistic effect) with respect to the live pass-through video content via usage of artificial intelligence (AI) methods. In some implementations, the light-spill effect may be enabled with respect to realistic, creative, or unrealistic presentation such that the light-spill effect may be generated (e.g., algorithmically, through AI, etc.) to provide a creative lighting effect that is physically unrealistic but provides a pleasant viewing experience. For example, when a user is listening to music, the light-spill effect may augment the live pass-through video content to associate with a timing or presentation of the music. In some implementations, AI may be used to identify objects (including light sources) and associated positions within view of live pass-through video content. In some implementations, live pass-through video content may be modified with respect to identified light sources or to enable the light-spill effect with respect to a specified object within the live pass-through video content.

In some implementations, one or more colors for the light-spill effect may be determined by down-sampling the virtual content to produce a blurred image representing the virtual content and selecting a single dominant color of the down-sampled virtual content. In some implementations, one or more colors for the light-spill effect may be determined by down-sampling the virtual content to produce a blurred image representing the virtual content and selecting a dominant color(s) for each side (e.g., left side and right side) of the down-sampled virtual content. For example, a down sampled and blurred texture (e.g., 16×16 pixels) may be selected such that 16 pixels is available to sample from on each side (e.g., left side and right side) of the down-sampled virtual content. Likewise, a down sampled and a blurred texture comprising more pixels (e.g., 32×32) or less pixels (e.g., 8×8) may be selected to modify the light-spill effect. In some implementations, a dynamic selection may be enabled based on video or an alternative setting.

In some implementations, a hardware blend architecture (e.g., blend circuitry) implemented process may be used to blend pass-through video frames of the live pass-through video content with content of the virtual object. The blending process is configured to implement the light-spill effect in real time. In some implementations, the blending process may include a tinting/color mixing process using hardware-based logical pixel operations. The blending process may include any type of blending technique.

In some implementations, a (electronic) device has a processor (e.g., one or more processors) that executes instructions stored in a non-transitory computer-readable medium to perform a method. The method performs one or more steps or processes. In some implementations, the device captures pass-through video of a physical environment via at least one camera of the device. In some implementations, virtual content is produced. In some implementations, a color is calculated from the virtual content. In some implementations, blend circuitry of the device is controlled to generate augmented reality video by blending the pass-through video with the virtual content and by modifying at least one portion of the pass-through video with the calculated color from the virtual content.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
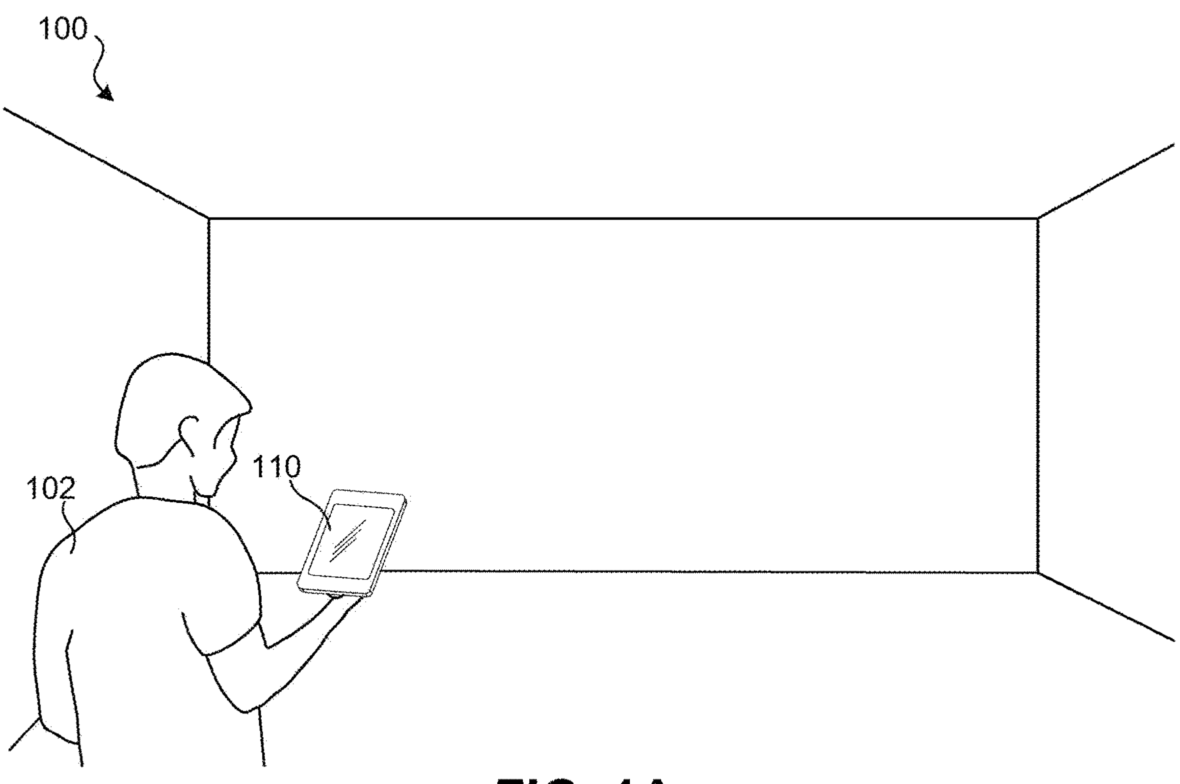
FIGS. 1A-B illustrate exemplary electronic devices operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
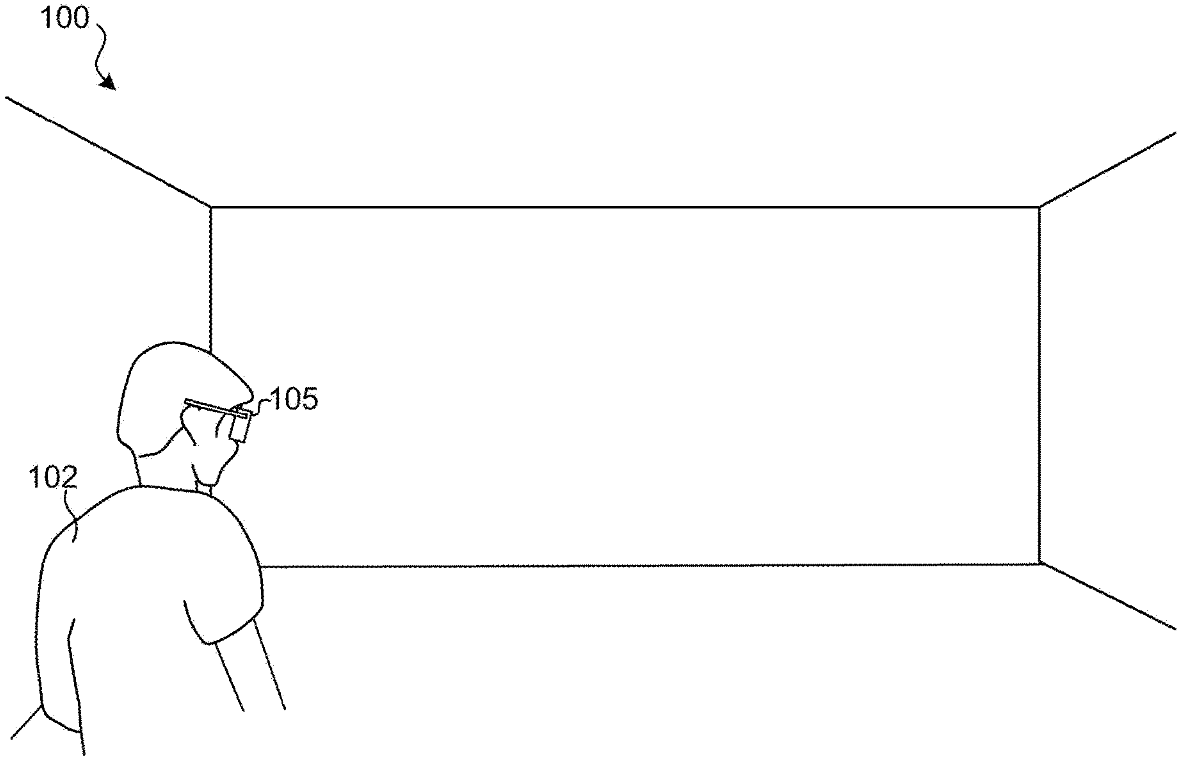

FIGS. 1A-B illustrate exemplary electronic devices 105 and 110 operating in a physical environment 100. In the example of FIGS. 1A-B, the physical environment 100 is a room. The electronic devices 105 and 110 may include one or more cameras, microphones, depth sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

In some implementations, pass-through video depicting a physical environment (e.g., physical environment 100) is received from an image sensor (e.g., outward-facing cameras) of a device (e.g., device 105 or device 110). In some implementations, diffused lighting emitted from a virtual object (e.g., of an MR or XR environment presented via an HMD such as device 105 or device 110) is used to illuminate and provide a light-spill effect projected around, adjacent to, or over the virtual object such that the light-spill effect is projected over a real-world object(s) of the physical environment (e.g., a wall, a floor, furniture, etc.). The light-spill effect is configured to provide a realistic lighting effect corresponding to an overall tinting/color mix of the diffused lighting emitted from the virtual object. For example, if the overall tinting/color mix of the diffused lighting is blue, then the light-spill effect may be presented as an associated variation of the blue diffused lighting (e.g., light blue). In some implementations, a dedicated hardware blend architecture (e.g., blend circuitry) is utilized to determine and apply a specified tinting, dimming, or brightness effect with respect to the light-spill effect.

Figure 2A:
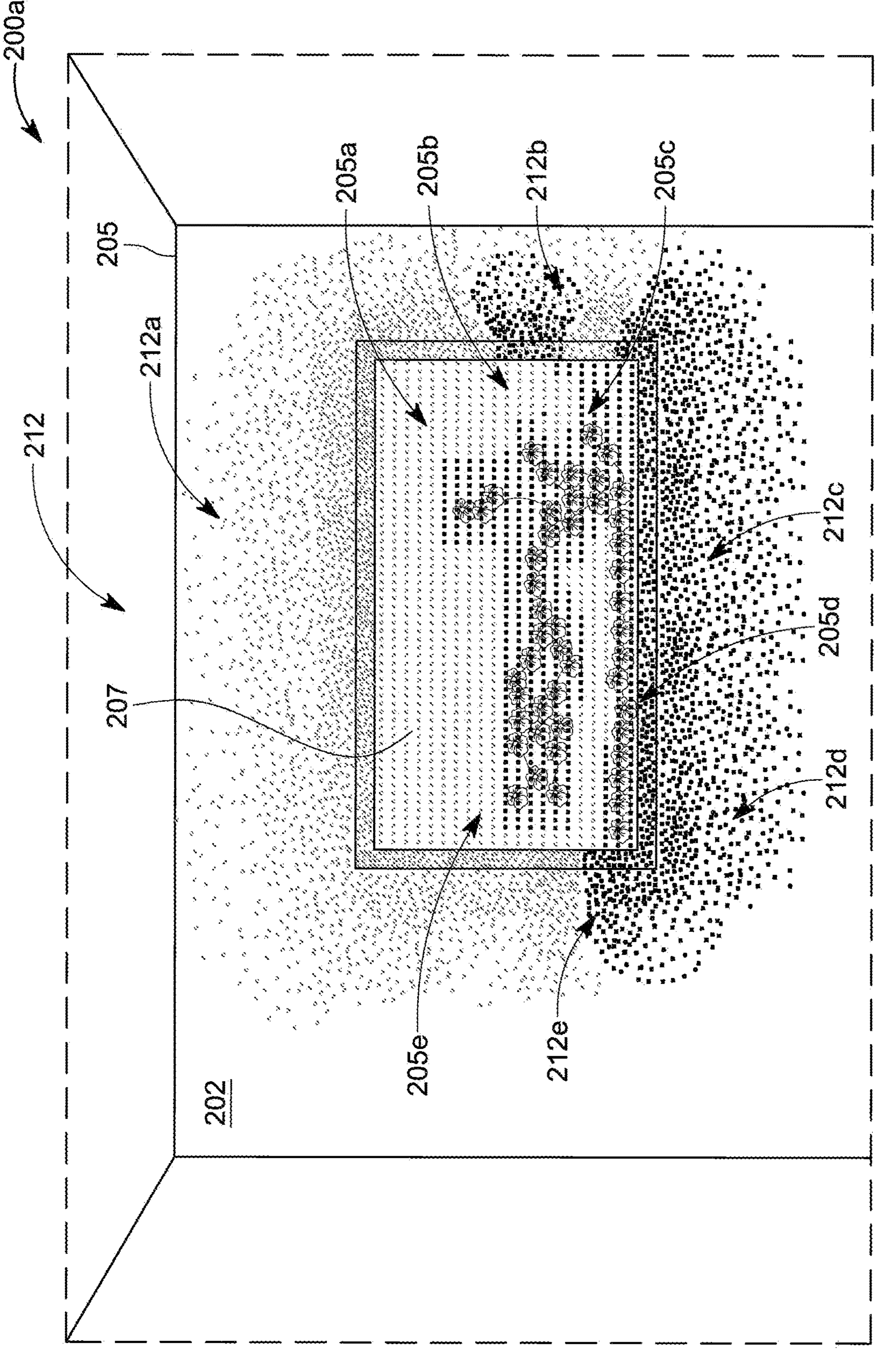
FIGS. 2A-2B illustrate views of an XR environment provided by the devices of FIG. 1, in accordance with some implementations.

FIG. 2A illustrates a view 200*a* of an extended reality (XR) environment 202 provided by a device (e.g., device 105 and/or 110 of FIG. 1), in accordance with some implementations. XR environment 202 includes (live) pass-through video 205 of a physical environment (e.g., a wall as illustrated in FIG. 2A) and a virtual representation of a virtual object 207 (e.g., a virtual television or display providing a view of a video stream or a picture such as a photo). Virtual object 207 may comprise any structural shape such as, inter alia, rectangular (as illustrated in FIG. 2A), non-rectangular (e.g., circular, triangular, etc.), multi-shape, etc. View 200*a* illustrates a light-spill effect 212 (associated with lighting attributes, such as color, tint, etc. associated with lighting of the virtual object 207) presented adjacent to, over, and/or around the virtual object 207 (e.g., virtual reality content such as a system environment, augmented reality content such as an object located behind a backplane of virtual object 207). The light-spill effect 212 is generated based on light attributes of a virtual light source (i.e., the virtual object 207). View 200*a* may be a view presented to a user wearing an HMD (e.g., device 105 or device 110) in their living room (e.g., the physical environment) watching a virtual screen (e.g., virtual television screen or display that is depicted on a wall within the living room as illustrated in FIG. 2A).

Light-spill effect 212 includes light-spill effect portions 212*a*-212*e*. Light-spill effect portion 212*a* comprises a tinting color mix associated with a color of portion 205*a* (i.e., comprising multiple colors) of a (active lighted) screen of virtual object 207. Light-spill effect portion 212*b* comprises a tinting color mix associated with a color mix of portions 205*b* and 205*c* (flowers) of the screen virtual object 207. Light-spill effect portion 212*c* comprises a tinting color mix associated with a color mix of portions 205*c* and 205*d* of the screen of virtual object 207. Light-spill effect portion 212*d* comprises a tinting color mix associated with a color mix of portions 205*d* and 205*e* of the screen virtual object 207. Light-spill effect portion 212*e* comprises a tinting color mix associated with a color of portion 205*e* of the screen of virtual object 207. Light-spill effect portions 212*a*-212*e* represent a realistic color-based pattern that may mimic an appearance of virtual light virtually emanating from the virtual object 207 (e.g., virtually reflecting from the real wall) such that, while a user is immersed with in XR environment (via an HMD), illumination effects (i.e., light-spill effect) from content on a virtual screen of virtual object 207 are presented to the user in a realistic manner, e.g., presenting virtual light-spill that is similar to the light-spill that a real TV, etc. might provide. A light-spill effect may be provided with respect to various types of virtual light emitting (or reflecting) objects. As non-limiting examples, a light-spill effect may be implemented with respect to, inter alia, virtual user interface menus, a 3D virtual object with depth or contours such as a virtual statue, a 2D plane based object embedded in within a 3D environment (e.g., a photo application, a web browser application, etc.), etc. Likewise, a light-spill effect may be implemented with respect to, inter alia, identifying shiny or specular reflective objects e.g., within XR environment 202) and related information describing associated material properties. For example, a light-spill effect may be implemented with respect to a polished white vase such that a specular reflection of content is placed on the vase.

In some implementations, light-spill effect 212 may be based on, at least in part, pass-through video 205 content. For example, the light-spill effect may have an appearance determined based on an appearance of virtual light virtually emanating from the virtual object 207 and an appearance of real-world content that the light spill effect will overlie. In one example, an appearance of virtual light virtually emanating from the virtual object 207 is adjusted based a scaled-down version of live pass-through video 205 content color video texture, e.g., to produce a light-spill effect 212 using the virtual light adjusted (e.g., multiplied with respect to) color from the physical environment.

In some implementations, light-spill effect 212 may be enabled with respect to pass-through video 205 content via usage of a reconstructed geometric mesh (e.g., generated via a software development kit enabling development of augmented reality (AR) experiences) to further enhance lighting computation by using surface normals generated by the reconstructed geometric mesh. In some implementations, light-spill effect 212 may be enabled (to generate a realistic or artistic effect) with respect to pass-through video 205 content via usage of artificial intelligence (AI) methods. In some implementations, light-spill effect 212 may be enabled with respect to realistic, creative, or unrealistic presentation such that light-spill effect 212 may be generated (e.g., algorithmically, through AI, etc.) to provide a creative lighting effect that is physically unrealistic but provides a pleasant viewing experience. For example, when a user is listening to music, light-spill effect 212 may augment pass-through video 205 content to associate with a timing or presentation of the music. In some implementations, AI may be used to identify objects (including light sources) and associated positions within a view of pass-through video 205 content. In some implementations, pass-through video 205 content may be modified with respect to identified light sources or to enable light-spill effect 212 with respect to a specified object within the live pass-through video content.

In some implementations, the light-spill effect 212 (e.g., tinting/color mix) is generated (using hardware-based logical pixel operations) in response to capturing frames of the pass-through video 205 (of a physical environment) via outward-facing cameras (of an HMD) connected to a display (of the HMD) via a dedicated hardware path of an application specific integrated circuit (ASIC). In some implementations, light detection and ranging information may be captured and processed. The light detection and ranging information may be combined with a software development kit enabling development of AR experiences for generating a mesh to enable light-spill effect color processing. Additional sensor data (e.g., infrared data) may be additionally used to augment the light-spill effect.

The ASIC (comprising dedicated processors) is configured to process frames of the pass-through video 205 at a high frames per second (FPS) rate such as, e.g., a frame rate greater than 60 FPS. In some implementations, the ASIC retrieves each frame (of the pass-through video 205) from the outward-facing cameras and blends each frame (of the pass-through video 205) with virtual content (corresponding to a diffuse-light producing object such as virtual object 207) comprising frame-specific virtual content associated with each frame of the pass-through video 205. The blending process may include an alpha blending process for combining each of the frames of the pass-through video (i.e., background content) with the frame-specific virtual content to create an appearance of transparency with respect to portions of the pass-through video. In some implementations, alpha-blend values associated with the pass-through video 205 in areas corresponding to the virtual content may be adjusted.

In some implementations, using a hardware-based process to blend pass-through frames with virtual object content to implement the light-spill effect 212 may enable a process for adding the virtual content and light-spill effect 212 quickly, e.g., in real-time live views, and/or using fewer resources than might otherwise be required to 3D model virtual light rays emitted from the virtual object 207.

As a result of the blending process, an augmented pass-through video view comprising real and virtual content is generated for presentation to a user. A portion of each of the frames of the pass-through video may be altered to generate a light-spill effect (viewable within the augmented pass-through video view as illustrated in FIG. 2A) based on at least one color determined from the frame-specific virtual content. Each color may by determined by down-sampling the virtual content to produce a blurred image representing the virtual content (e.g., a blurred image of the screen contents of the virtual object 207) and selecting a color(s) based on identifying: a dominant color of the down-sampled virtual content, a dominant color for each side of the virtual content, etc.

Altering a portion of each of the frames of the pass-through video may be executed via operation of an ASIC and may include tinting, dimming, or changing a brightness of a respective portion of each of the frames. In some implementations, the altering process may include performing a hardware-implemented logic operation via an ASIC.

Figure 2B:
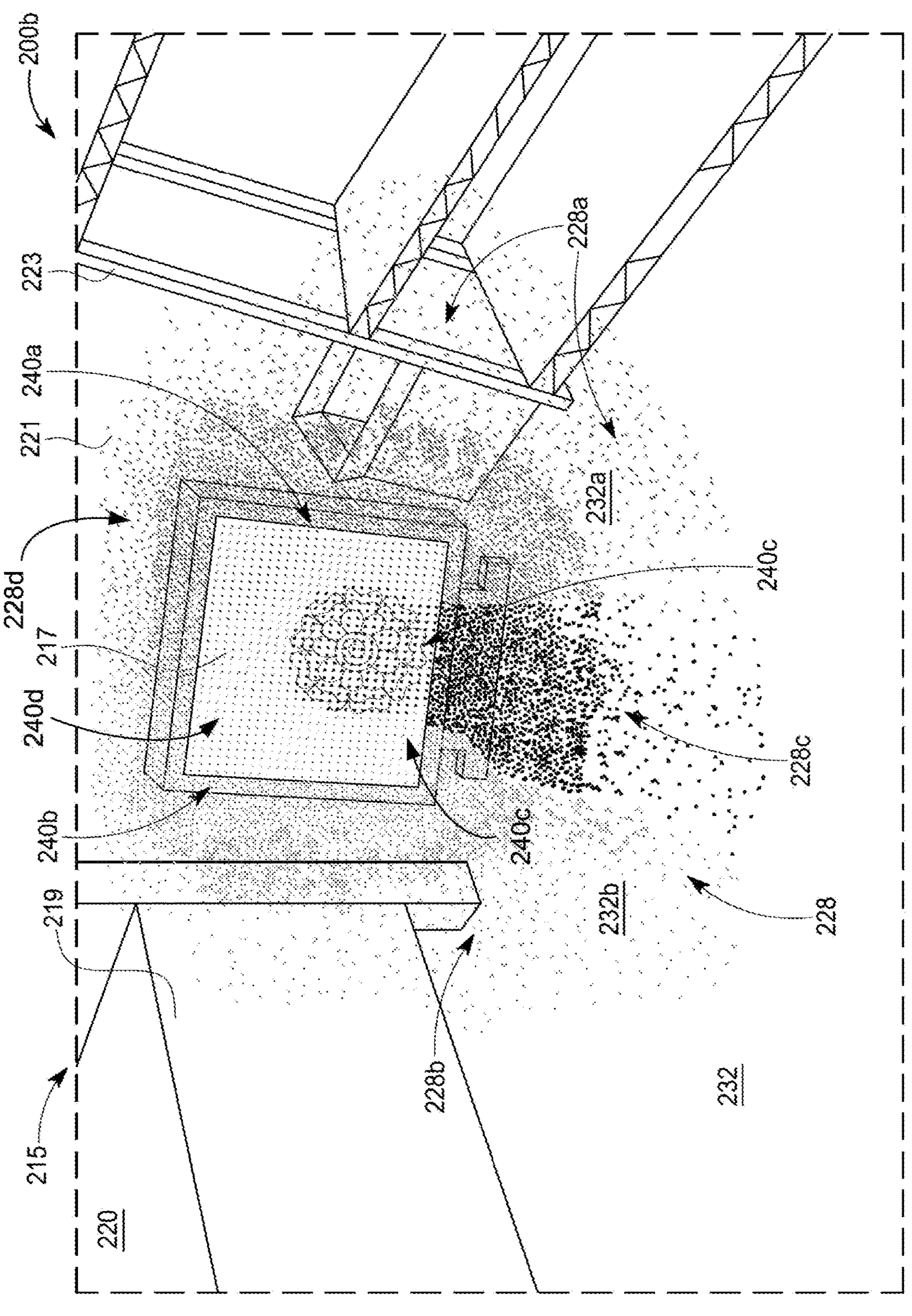

FIG. 2B illustrates a view 200*b* of an extended reality (XR) environment 220 provided by a device (e.g., device 105 and/or 110 of FIG. 1), in accordance with some implementations. XR environment 220 includes (live) pass-through video 221 of a physical environment (e.g., a representation of a room 215 as illustrated in FIG. 2B) and a virtual representation of a virtual object 217 (e.g., a virtual television providing a view of a video stream or a picture such as a photo). Representation of room 215 comprises a representation of a bed 219, a representation of a shelf 223 and a representation of a floor 232.

View 200*b* illustrates a light-spill effect 228 (associated with lighting attributes, such as color, tint, etc. of the virtual object 217) presented adjacent to and around portions the virtual object 217. The light-spill effect 228 is generated based on light attributes of a virtual light source (i.e., the virtual object 217). View 200*b* may be a view presented to a user wearing an HMD (e.g., device 105 or device 110) in their living room (e.g., room 215) watching a virtual screen (e.g., virtual television screen that is depicted within room 215 as illustrated in FIG. 2B).

Light-spill effect 228 includes light-spill effect portions 228*a*-228*b*. Light-spill effect portion 228*a* comprises a tinting color mix associated with a color of portion 240*a* (i.e., comprising multiple colors) of a (active lighted) screen of virtual object 217. Light-spill effect portion 228*a* represents a realistic color-based pattern that mimics an appearance of virtual light virtually emanating from portion 240*a* of the screen of virtual object 217 and onto representation of shelving unit 223 and a representation of portion 232*a* of floor 232. Light-spill effect portion 228*b* comprises a tinting color mix associated with a color of portion 240*b* (i.e., comprising multiple colors) of a (active lighted) screen of virtual object 217. Light-spill effect portion 228*b* represents a realistic color-based pattern that mimics a lighting pattern reflecting off portion 240*b* of the screen the screen of virtual object 217 and onto representation of bed 219 and representation of portion 232*b* of floor 232.

In some implementations, the light-spill effect 228 (e.g., tinting/color mixing using hardware-based logical pixel operations) is generated in response to capturing frames of the pass-through video 221 (of a physical environment) via outward-facing cameras (of an HMD) connected to a display (of the HMD) via a dedicated hardware path of an application specific integrated circuit (ASIC) as described with respect to FIG. 2A, supra. Combining a high frames per second and low-latency hardware path from a camera to a display creates a hardware blend function associated with a lightweight (e.g., efficient and fast) tint effect.

Figure 3:
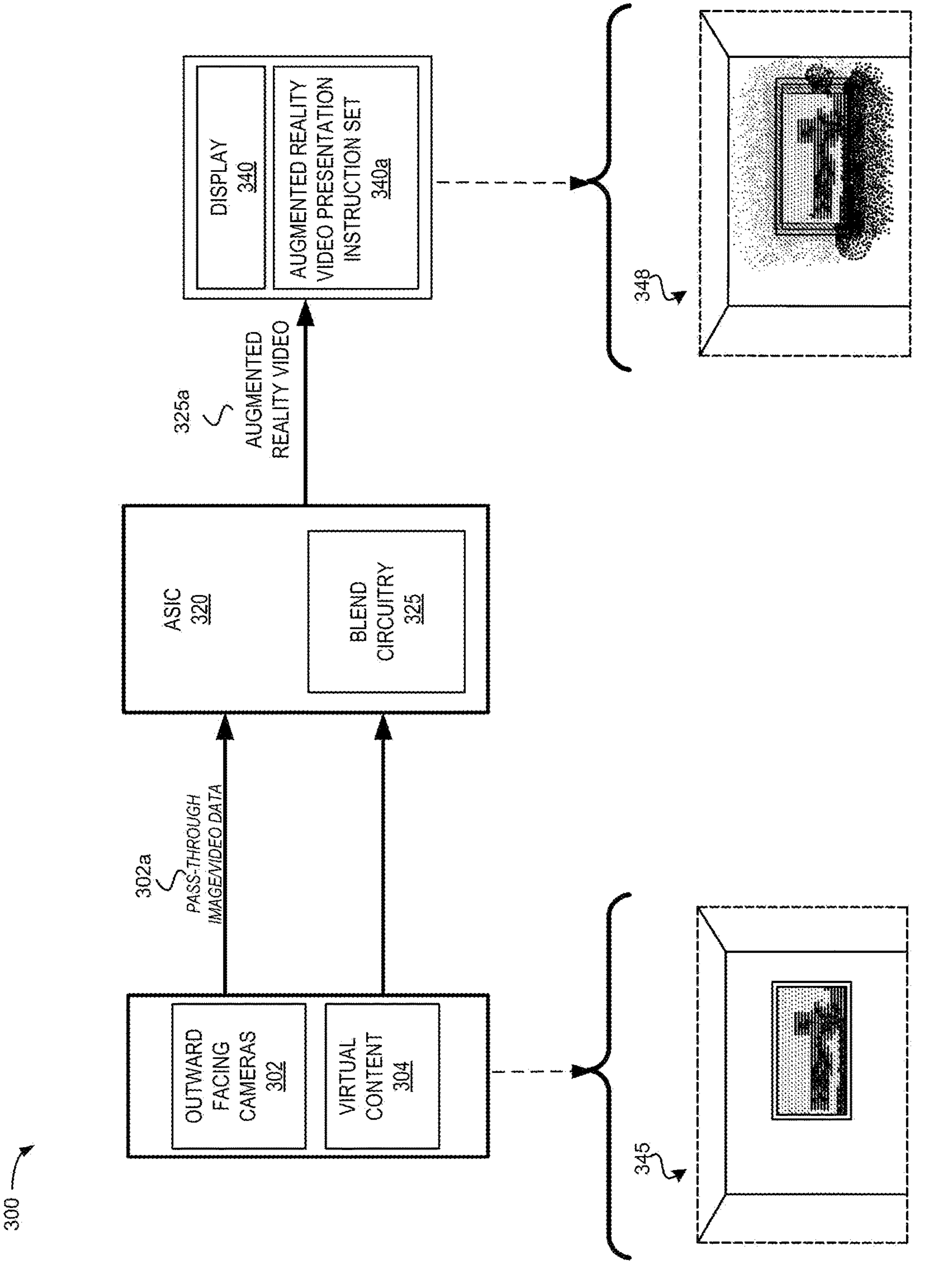
FIG. 3 is a system flow diagram of an example environment in which a system can illuminate portions of pass-through video depicting a physical environment based on light from a virtual light source, in accordance with some implementations.

FIG. 3 is a system flow diagram of an example environment 300 in which a system can illuminate (via a light-spill effect 212) portions of passthrough video depicting a physical environment based on light from a virtual light source, in accordance with some implementations. In some implementations, the system flow of the example environment 300 is performed on a device (e.g., device 105 or 110 of FIG. 1), such as a mobile device, head-mounted device (HMD), desktop, laptop, or server device. In some implementations, the system flow of the example environment 300 is performed on processing logic, including hardware, firmware, software, or a combination thereof. In some implementations, the system flow of the example environment 300 is performed on a processor executing code stored in a non-transitory computer-readable medium (e.g., a memory).

The system flow of the example environment 300 utilizes a hardware-based process to blend frames of pass-through video with virtual object content to implement the light-spill effect. The hardware-based process is initiated in response to acquiring the frames of pass-through image/video data 302*a* from outward facing cameras 302 of a device such as an HMD.

Additionally, the system flow 300 generates or acquires virtual content comprising a virtual representation of a virtual object such as a virtual television providing a view of a video stream or a picture such as a photo. Virtual content may have a 2D or 3D shape and may be positioned within a 3D environment/coordinate system corresponding to the physical environment. In some implementations, virtual content such as a virtual television is given a fixed position within the 3D environment (e.g., providing world-locked virtual content), e.g., so that the virtual television will appear to the user to remain at a fixed position 3 feet in front of the corner of the user's room, even as the user moves about and views the room with virtual content added from different viewpoints. In some implementations, virtual content such as a virtual television is provided at a fixed position relative to the user (e.g., user-locked virtual content), e.g., so that the virtual television will appear to the user remain a fixed distance in front of the user, even as the user moves about and views the room with virtual content added from different viewpoints. Acquiring the virtual content may involve determining a 3D position of the virtual content and determining a partial image (e.g., a partial 2D frame of virtual only content) from a viewpoint within the 3D environment. Such a viewpoint may be based on the device's current position within the physical environment corresponding to the 3D environment.

The system flow assesses the pass-through image/video data 302*a* and the virtual content 304 to generate an XR environment that includes the pass-through image/video data 302*a* and the virtual content represented in view 345.

In some implementations, a light-spill effect (e.g., tinting/color mixing using hardware-based logical pixel operations) is generated in response to capturing frames of the pass-through image/video data 302*a* via outward-facing cameras 302 connected to a display 340 (of an HMD) via a dedicated hardware path implemented via ASIC 320. ASIC 320 (comprising dedicated processors) is configured to execute blend circuitry 325 to retrieve each frame (of the pass-through image/video data 302*a*) from the outward-facing cameras 302 and blend each frame with virtual content 304 (e.g., a partial 2D image corresponding to a light producing object such as a virtual television) comprising frame-specific virtual content associated with each frame of the pass-through image/video data 302*a*.

As a result of the blending process, an augmented reality video 348 comprising real and virtual content is generated (via execution of augmented pass-through video presentation instruction set 340*a*) for presentation to a user via display 340.

In some implementations, generating a light-spill effect involves identifying a pixel region (e.g., a portion of the rectangular display area/pixel grid) that corresponds to a virtual object. Areas of the pass-through video around or otherwise near the virtual object pixel region may be identified, e.g., identifying all pass-through pixels within a specified distance (e.g., X number of pixels) of the pixel region. These identified areas of the pass-through may then be altered to provide a light-spill effect. In some implementations, the light spill effect varies or otherwise depends upon the distance (e.g., in pixel space) from the virtual object pixel region. For example, passthrough video pixels that are nearest the virtual object pixel region may be altered more (e.g., showing brighter light-spill) than pixels further from the virtual object pixel region. In one example, pixel brightness is reduced (e.g., using a linear or other function) as distance from the virtual object pixel region increases.

A portion (e.g., some or all) of each of the frames of the pass-through video may be altered to generate the light-spill effect (viewable within the augmented passthrough video view 348) based on at least one color determined from the frame-specific virtual content. Each color may by determined by down-sampling the virtual content to produce a blurred image representing the virtual content (e.g., a blurred image of the screen contents of the virtual television) and selecting a color(s) based on identifying: a dominant color of the down-sampled virtual content, a dominant color for each side of the virtual content, etc. In some implementations, pixels of pass-through video are altered based on a color of a nearest (e.g., in pixel space) pixel of a virtual object pixel region, an average of a number N of closest pixels, or based on other criteria configured to select a light-spill color appropriate for the respective pixels of the pass-through video based on light emitted by certain (e.g., nearby or otherwise most relevant) portions of the virtual object.

Altering a portion of each of the frames of the pass-through image/video data 302*a* may be executed via operation of the ASIC 320 and may include tinting, dimming, or changing a brightness of a respective portion of each of the frames. In some implementations, the altering process may include performing a hardware-implemented logic operation via the ASIC 320.

In some implementations, light-spill effects are added to pass-through video with virtual light-emitting objects added in which the light-spill effects are produced to mimic the 3D distribution of light from the virtual light-emitting object without needing to make 3D computations, e.g., without calculating 3D ray directions for virtual light rays emanating from the virtual object. In some implementations, the light-spill effect is added by altering 2D passthrough data (e.g., pass-through pixel values) based on the 2D spatial relationship (e.g., in pixel space) of those pixels from a virtual object pixel region of 2D virtual object content that is being blended with 2D pass-through content, e.g., using a hardware-based blending process.

Figure 4:
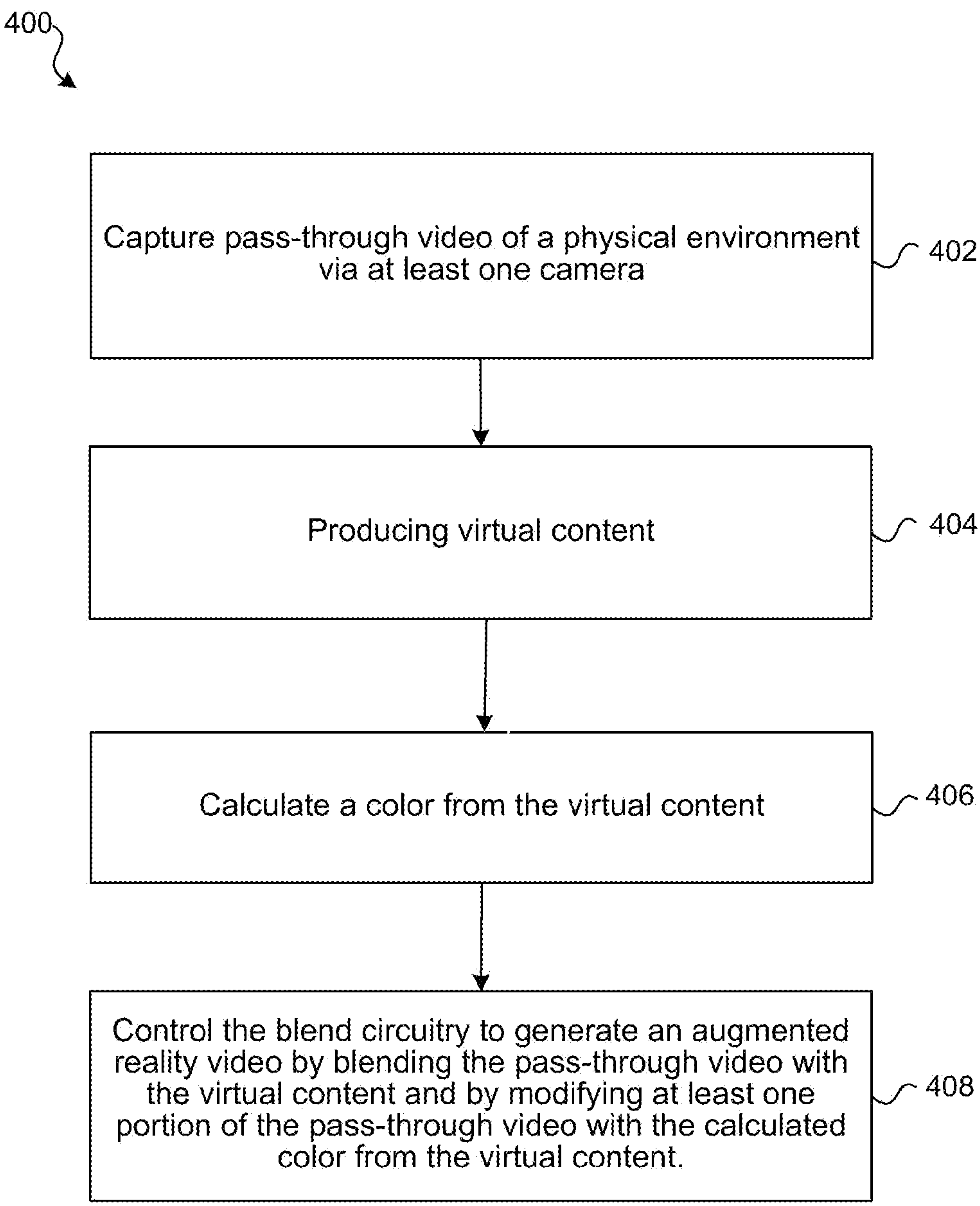
FIG. 4 is a flowchart illustrating an exemplary method that enables presentation of a representation of a virtual three-dimensional (3D) environment overlaying pass-through video of a physical environment, in accordance with some implementations.

FIG. 4 is a flowchart representation of an exemplary method 400 that utilizes a dedicated hardware blend architecture (e.g., blend circuitry) comprising a dedicated pathway to provide a view of live pass-through video with a virtual object including a light-spill effect displayed with respect to the virtual object, in accordance with some implementations. In some implementations, the method 400 is performed by a device, such as a mobile device, desktop, laptop, HMD, or server device. In some implementations, the device has a screen for displaying images and/or a screen for viewing stereoscopic images such as a head-mounted display (HMD such as e.g., device 105 of FIG. 1). In some implementations, the method 400 is performed by processing logic, including hardware, firmware, software, or a combination thereof. In some implementations, the method 400 is performed by a processor executing code stored in a non-transitory computer-readable medium (e.g., a memory). Each of the blocks in the method 400 may be enabled and executed in any order.

At block 402, the method 400 captures (via a device (e.g., an HMD) comprising a blend circuitry (e.g., hardware blend architecture) comprising a dedicated pathway to at least one camera) pass-through video of a physical environment via at least one camera of the device. At block 404, the method 400 produces virtual content corresponding to a virtual light producing object. The virtual content may include frame-specific virtual content for each of the plurality of frames of the pass-through video. In some implementations, virtual light producing object may include, inter alia, a virtual movie screen, a virtual television, a virtual light producing 3D object (e.g., a lamp, a glow worm etc.), etc.

At block 406, the method 400 calculates a color from the virtual content.

At block 408, the method 400 controls the blend circuitry to generate an augmented reality video by blending the pass-through video with the virtual content and by modifying at least one portion of the pass-through video with the calculated color from the virtual content.

In some implementations, the method generates the augmented reality video view by combining (e.g., blending via the blend circuitry) each of the frames of the pass-through video with the frame-specific virtual content and altering a portion of each of the frames of the pass-through video to provide a light-spill effect. In some implementations, the light-spill effect may be based on at least one color determined from the frame-specific virtual content.

The blend circuitry may blend an image corresponding to a current pass-through video frame with an image (from a corresponding viewpoint) of virtual content positioned within a 3D coordinate system corresponding to the physical environment. For example, the images may be combined using a technique that forms a combined frame using some pixel values (e.g., certain pixel positions) from the pass-through video frame and some pixel values (e.g., certain pixel positions) from the virtual content frame. In one example, the blending utilizes alpha/transparency values, e.g., in pixel positions at which the pass-through video frame pixel is to be used, that pass-through pixel's values is set to not-transparent and the corresponding virtual object frame pixel's value is set to fully transparent and, conversely, in pixel positions at which the virtual object frame pixel is to be used, that pixel's values is set to fully-transparent and the corresponding virtual object frame pixel (which may be empty) is set to not transparent. The pass-through video may be a still image (e.g., a single repeated frame) or may comprises a plurality of different (non-identical) frames.

In some implementations, altering the portion of each of the frames of the pass-through video to provide the light-spill effect includes tinting, dimming, or changing a brightness of the respective portion of each of the frames.

In some implementations, altering the portion of each of the frames of the pass-through video to provide the light-spill effect includes performing a hardware-implemented logic operation via the blend circuitry.

In some implementations, altering the portion of each of the frames of the pass-through video to provide the light-spill effect includes utilizing the blend circuitry to apply a tinting, dimming, or brightness adjustment of the portion.

In some implementations, the at least one color determined from the frame-specific virtual content is determined by: down-sampling the virtual content to produce a blurred image representing the virtual content; and selecting the at least one color by identifying a dominant color of the down-sampled virtual content.

In some implementations, the at least one color determined from the frame-specific virtual content is determined by: down-sampling the virtual content to produce a blurred image representing the virtual content; and selecting the at least one color by identifying a first color on a first side of the down-sampled virtual content and a second color on a second side of the down-sampled virtual content.

In some implementations, combining each of the frames of the pass-through video with the frame-specific virtual content includes utilizing the blend circuitry to enable a hardware-based alpha blending process. In some implementations, combining each of the frames of the pass-through video with the frame-specific virtual content includes adjusting alpha-blend values corresponding to the pass-through video in areas corresponding to the virtual light producing object. In some implementations, the augmented pass-through video has a frame rate greater than 60 fps. (e.g., 90 fps).

In some implementations, the method 400 displays the augmented reality video via a display(s) of the device. In some implementations, the augmented reality video is provided in approximately real time with the capturing of the pass-through video. For example, less than one frame delay between image capture and display, less than 11 ms at 90 fps, etc.

Figure 5:
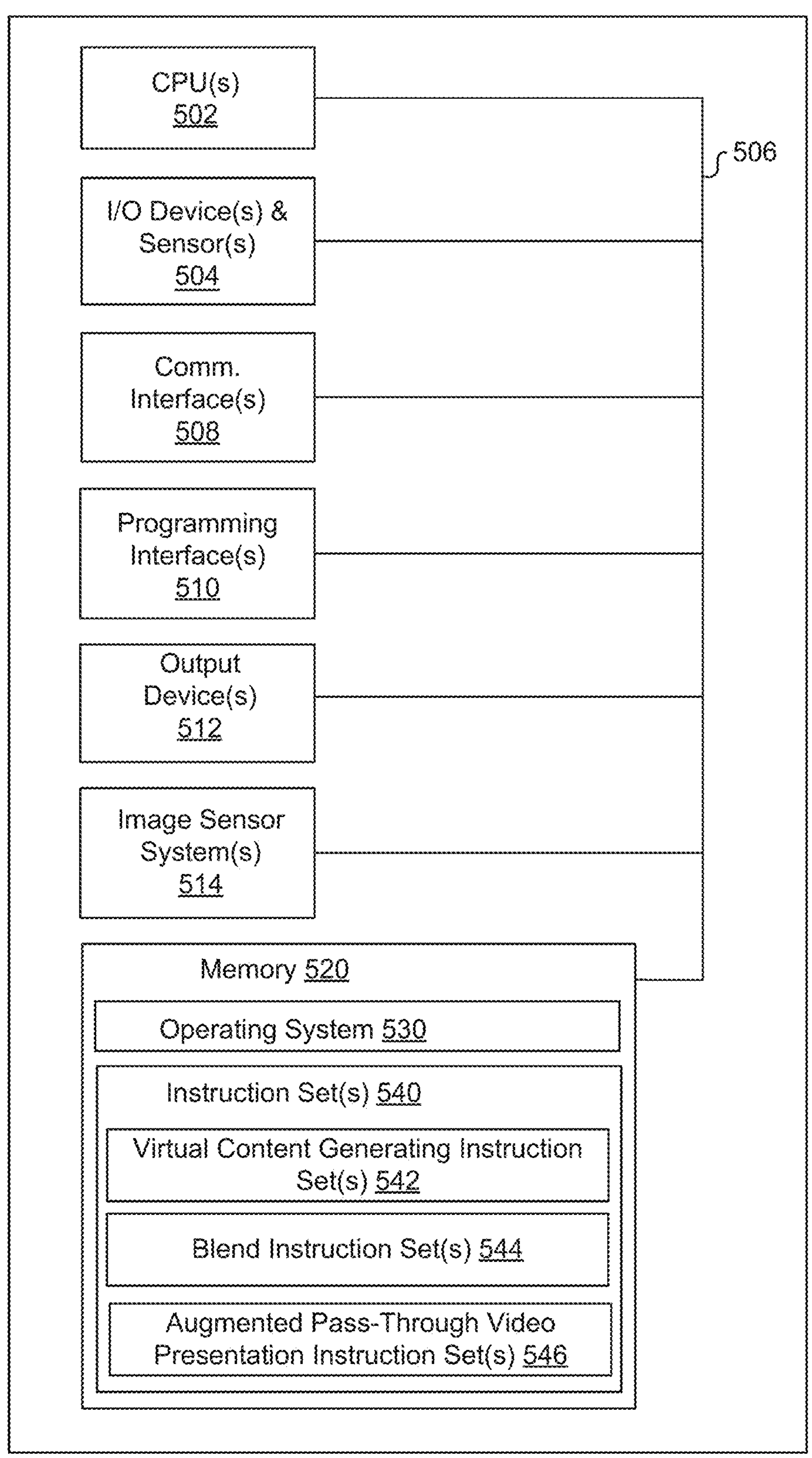
FIG. 5 is a block diagram of an electronic device of in accordance with some implementations.

FIG. 5 is a block diagram of an example device 500. Device 500 illustrates an exemplary device configuration for electronic devices 105 and 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units 502 (e.g., microprocessors, ASICs, FPGAs, GPUS, CPUs, processing cores, and/or the like), one or more input/output (I/O) devices and sensors 504, one or more communication interfaces 508 (e.g., USB, FIREWIRE, THUNDERBOLT, IEEE 802.3x, IEEE 802.11x, IEEE 802.14x, GSM, CDMA, TDMA, GPS, IR, BLUETOOTH, ZIGBEE, SPI, I2C, and/or the like type interface), one or more programming (e.g., I/O) interfaces 510, output devices (e.g., one or more displays) 512, one or more interior and/or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), one or more cameras (e.g., inward facing cameras and outward facing cameras of an HMD), one or more infrared sensors, one or more heat map sensors, and/or the like.

In some implementations, the one or more displays 512 are configured to present a view of a physical environment, a graphical environment, an extended reality environment, etc. to the user. In some implementations, the one or more displays 512 are configured to present content (determined based on a determined user/object location of the user within the physical environment) to the user. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 512 correspond to diffractive, reflective, polarized, holographic, etc. waveguide displays. In one example, the device 500 includes a single display. In another example, the device 500 includes a display for each eye of the user.

In some implementations, the one or more image sensor systems 514 are configured to obtain image data that corresponds to at least a portion of the physical environment 100. For example, the one or more image sensor systems 514 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 514 further include illumination sources that emit light, such as a flash. In various implementations, the one or more image sensor systems 514 further include an on-camera image signal processor (ISP) configured to execute a plurality of processing operations on the image data.

In some implementations, sensor data may be obtained by device(s) (e.g., devices 105 and 110 of FIG. 1) during a scan of a room of a physical environment. The sensor data may include a 3D point cloud and a sequence of 2D images corresponding to captured views of the room during the scan of the room. In some implementations, the sensor data includes image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, IMU, etc.). In some implementations, the sensor data includes visual inertial odometry (VIO) data determined based on image data. The 3D point cloud may provide semantic information about one or more elements of the room. The 3D point cloud may provide information about the positions and appearance of surface portions within the physical environment. In some implementations, the 3D point cloud is obtained over time, e.g., during a scan of the room, and the 3D point cloud may be updated, and updated versions of the 3D point cloud obtained over time. For example, a 3D representation may be obtained (and analyzed/processed) as it is updated/adjusted over time (e.g., as the user scans a room).

In some implementations, sensor data may be positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In some implementations, the device 500 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 500 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 500.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 includes a non-transitory computer readable storage medium.

In some implementations, the memory 520 or the non-transitory computer readable storage medium of the memory 520 stores an optional operating system 530 and one or more instruction set(s) 540. The operating system 530 includes procedures for handling various basic system services and for performing hardware dependent tasks. In some implementations, the instruction set(s) 540 include executable software defined by binary information stored in the form of electrical charge. In some implementations, the instruction set(s) 540 are software that is executable by the one or more processing units 502 to carry out one or more of the techniques described herein.

The instruction set(s) 540 includes a virtual content generating instruction set 542, a blend instruction set 544, and an augmented pass-through video presentation instruction set 548. The instruction set(s) 540 may be embodied as a single software executable or multiple software executables.

The virtual content generating instruction set 542 is configured with instructions executable by a processor to obtain pass-through video of a physical environment and generate virtual content corresponding to a virtual diffuse-light producing object.

The blend instruction set 544 is configured with instructions executable by a processor to retrieve frames (of pass-through image/video data) from outward-facing cameras (of an HMD) and blend each frame with virtual content (corresponding to a diffuse-light producing object such as a virtual television) comprising frame-specific virtual content associated with each frame of the pass-through image/video data.

The augmented pass-through video presentation instruction set 546 is configured with instructions executable by a processor to present (as a result of the blending process) an augmented passthrough video view comprising real and virtual content with a light-spill effect for presentation to a user via a display.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A device comprising: at least one camera capturing pass-through video of a physical environment;
- a display;
- blend circuitry that generates augmented reality video for the display from the pass-through video;
- at least one processor; and
- a non-transitory computer-readable storage medium comprising instructions that, when executed on the at least one processor, cause the device to perform operations comprising:
  - producing virtual content corresponding to a virtual light producing object, the virtual content comprising frame-specific virtual content for each of a plurality of frames of the pass-through video;
  - calculating a color from the virtual content; and
  - controlling the blend circuitry to generate the augmented reality video by blending the pass-through video with the virtual content and by modifying at least one portion of the pass-through video with the calculated color from the virtual content.

2. The device of claim 1, wherein the blend circuitry comprises a dedicated pathway to the at least one camera.

3. The device of claim 1, wherein the virtual light producing object is a virtual movie screen or a virtual television.

4. The device of claim 1, wherein the virtual light producing object is a virtual 3D object corresponding to a diffuse-light-producing 3D object.

5. The device of claim 1, wherein the modifying comprises combining,
- via the blend circuitry, each of the frames of the pass-through video with the frame-specific virtual content and altering a portion of each of the frames of the pass-through video to provide a light-spill effect, wherein the light-spill effect is based on at least one color determined from the frame-specific virtual content.

6. The device of claim 5, wherein altering the portion of each of the frames of the pass-through video to provide the light-spill effect comprises tinting, dimming, or changing a brightness of a respective portion of each of the frames.

7. The device of claim 5, wherein altering the portion of each of the frames of the pass-through video to provide the light-spill effect comprises performing a hardware-implemented logic operation via the blend circuitry.

8. The device of claim 5, wherein altering the portion of each of the frames of the pass-through video to provide the light-spill effect comprises utilizing the blend circuitry to apply a tinting, dimming, or brightness adjustment of the portion.

9. The device of claim 5, wherein the at least one color determined from the frame-specific virtual content is determined by:
- down-sampling the virtual content to produce a blurred image representing the virtual content; and
- selecting the at least one color by identifying a dominant color of the down-sampled virtual content.

10. The device of claim 5, wherein the at least one color determined from the frame-specific virtual content is determined by:
- down-sampling the virtual content to produce a blurred image representing the virtual content; and
- selecting the at least one color by identifying at least a first color on a first side of the down-sampled virtual content and at least a second color on a second side of the down-sampled virtual content.

11. The device of claim 5, wherein said combining each of the frames of the pass-through video with the frame-specific virtual content comprises utilizing the blend circuitry to enable a hardware-based alpha blending process.

12. The device of claim 5, wherein said combining each of the frames of the pass-through video with the frame-specific virtual content comprises adjusting alpha-blend values corresponding to the pass-through video in areas corresponding to the virtual light producing object.

13. The device of claim 1, wherein the augmented reality video has a frame rate greater than 60 fps.

14. The device of claim 1, wherein the operations further comprise displaying the augmented reality video.

15. A device comprising: at least one camera capturing pass-through video of a physical environment;
- a display;
- blend circuitry that generates augmented reality video for the display from the pass-through video;
- at least one processor; and
- a non-transitory computer-readable storage medium comprising instructions that, when executed on the at least one processor, cause the device to perform operations comprising:
  - producing virtual content;
  - calculating a color from the virtual content; and
    - controlling the blend circuitry to generate the augmented reality video by blending the pass-through video with the virtual content and by modifying at least one portion of the pass-through video with the calculated color from the virtual content, wherein the augmented reality video is provided in approximately real time with the capturing of the pass-through video.

16. A method comprising:

at a device having, at least one processor, at least one camera, a display, and blend circuitry:

capturing pass-through video of a physical environment via the at least one camera;

producing virtual content corresponding to a virtual light producing object, the virtual content comprising frame-specific virtual content for each of a plurality of frames of the pass-through video;

calculating a color from the virtual content; and controlling the blend circuitry to generate an augmented reality video by blending the pass-through video with the virtual content and by modifying at least one portion of the pass-through video with the calculated color from the virtual content.

17. The method of claim 16, wherein the blend circuitry comprises a dedicated pathway to the at least one camera.

18. A non-transitory computer-readable storage medium storing program instructions executable via one or more processors, of a device having at least one camera, a display, and blend circuitry, to perform operations comprising:

capturing pass-through video of a physical environment via the at least one camera;

producing virtual content corresponding to a virtual light producing object, the virtual content comprising frame-specific virtual content for each of a plurality of frames of the pass-through video;

calculating a color from the virtual content; and controlling the blend circuitry to generate an augmented reality video by blending the pass-through video with the virtual content and by modifying at least one portion of the pass-through video with the calculated color from the virtual content.

* * * * *